Sept. 13, 1927.

R. C. ZUCKERMAN

GATHERING MECHANISM FOR ONION HARVESTERS

Original Filed Oct. 13, 1924

1,642,287

INVENTOR

R. C. Zuckerman

BY *Perry S. Webster*

ATTORNEY

Patented Sept. 13, 1927.

1,642,287

UNITED STATES PATENT OFFICE.

ROSCOE C. ZUCKERMAN, OF STOCKTON, CALIFORNIA.

GATHERING MECHANISM FOR ONION HARVESTERS.

Original application filed October 13, 1924, Serial No 743,296. Divided and this application filed May 3, 1926. Serial No. 106,582.

This invention relates to improvements in agricultural machinery and particularly to harvesters of onions and similar produce; being a divisional application of my application for patent on an onion harvester, filed October 13th, 1924, Serial No. 743,296.

The subject matter of the present invention relates to the mechanism on the harvester for gathering the onions from the ground after they have been pulled and placed in windrows; my principal object being to provide a mechanism of this character so constructed that it will yieldably act on the piles of onions irrespective of their height, and will cause them to be moved easily along the scoop means without danger of them piling up, and will deliver them evenly onto the conveyor.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
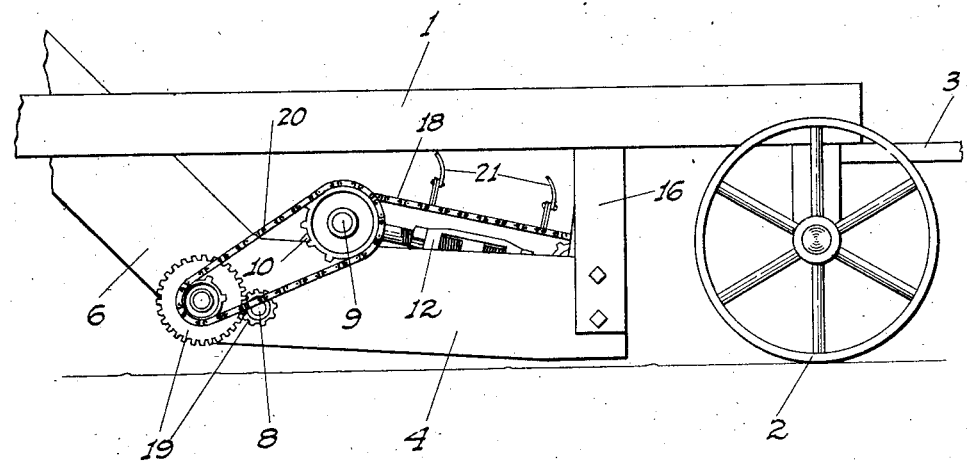
Fig. 1 is an outside fragmentary elevation of the front end of the harvester showing the gathering mechanism associated therewith.
Figure 2:
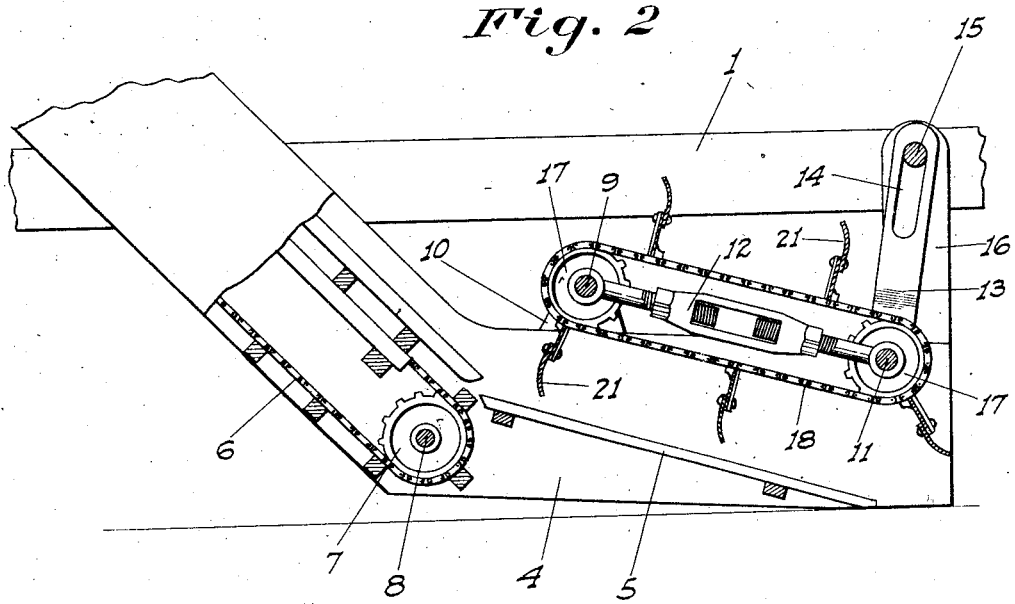
Fig. 2 is a sectional elevation of the structure.

Referring now more particularly to the characters of reference on the drawings, the harvester includes transversely spaced side frames 1 supported at both front and rear by wheels, the front wheels being steerable and shown at 2, being connected to a drawbar 3.

Mounted on and extending between the frames are side members 4 of suitable height. The lower ends of these members are adapted to come close to the ground, especially at their forward ends. Fixed between these members is an onion scooping means which comprises transversely spaced bars 5 of a suitable length and having a certain upward tilt from their forward ends, at which ends they dig slightly into the ground. The advantages of this particular type of scoop means and their specific arrangement have been fully set forth in the previous aforementioned application, and hence further comment on the same is unnecessary herein.

The rear ends of these bars aline with and deliver onto the lower end of a conveyor 6 which at such end passes around sprockets 7, fixed on a shaft 8. This conveyor is driven from its upper end as shown in said previous application. The side members 4 form rigid extensions of the sides of the conveyor.

Mounted a certain distance above the bars 5 and adjacent the rear end thereof is a transverse shaft 9 journaled in brackets 10 on the side members 4. Also positioned above the bars 5 but adjacent the forward ends thereof is another transverse shaft 11. These two shafts are connected together by rigid turnbuckles 12, which not only hold the shafts in substantially rigid relation to each other, forming a connecting frame therebetween, but serve as a means for adjusting the distance therebetween. Projecting upwardly from the shaft 11 and pivoted thereon, are arms 13 having vertical slots 14 adjacent their ends. A transverse shaft 15 passes through such slots, said shaft being secured at its end to supports 16 projecting upwardly from and attached to the members 4. In this manner it will be seen that while the shaft 11 has a certain freedom of vertical movement, such movement is limited in both directions by the length of the slots 14. It will also be seen that with such movement of the forward shaft 11, the turnbuckles and the other shaft will turn about the pivotal connection of said other shaft 9 with the side members 4.

Fixed on the shafts 9 and 11 are sprocket wheels 17 about which pass endless chains 18. The shaft 9 is driven so as to cause the chains to travel in a direction so that the lower runs thereof will move from front to rear of the scoop or opposite to the direction of rotation of the conveyor shaft 8. This is preferably done from the shaft 8 by direction changing gearing 19 driven from said shaft, and a chain drive 20 from the gearing to the shaft 9.

Projecting outwardly from the chains 18 at intervals and extending transversely of the scoop bars are paddles 21, whose outward portions at least are preferably of some flexible material such as leather. The lower ends of these paddles clear the upper surface of the scoop by a certain desired distance, when the shaft 15 is engaged with the top of the slots 14. The function of these paddles is to aid in the scooping or gathering up of the onions, in conjunction with the scoop bars 5, so that said onions will not tend to merely pile up on the front of the scoop but are positively carried to the rear end thereof. Should the mass of onions encountered by one of the descending paddles at the front end of the gathering or conveying structure be so great that undue resistance to the movement of the onions and paddles is had, said paddles can raise up and clear the load, owing to the flexible or yielding mounting of the forward shaft 11.

The side plates 4 extend above the lower runs of the chains 18, so that there is no chance for the onions as engaged by the paddles to roll laterally and clear of the scoop and rear conveyor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an onion harvester, scoop means for gathering onions from the ground, side members between which the scoop means is mounted and an auxiliary gathering mechanism cooperating with the scoop means; said mechanism comprising a transverse shaft above and adjacent the rear end of the scoop means and journaled on the side members, another shaft independent of the side members disposed above and adjacent the forward end of the scoop means, means rigidly connecting the shafts, endless members mounted in connection with and passing about the shafts, paddles fixed at intervals on said endless members and projecting outwardly therefrom transversely of the scoop means, a transverse shaft supported from the side members above the forward one of the first-named shafts, and arms pivotally mounted on said first named forward shaft and extending thence to the transverse shaft; said arms having slots through which said transverse shaft passes.

2. In an onion harvester, scoop means for gathering onions from the ground, and an auxiliary gathering mechanism cooperating with the scoop means; said mechanism comprising an endles conveyor structure extending lengthwise of the scoop means above the same, means pivotally mounting the rear end of the structure in connection with the scoop means, means between the side frames and the front end of the structure for normally supporting the latter clear of the scoop means while permitting of free but limited vertical movement of said front end of the conveyor, and means rigidly connecting the pivoted and front ends of the conveyor, whereby the entire conveyor structure will move about the pivoted end thereof as an axis with the vertical movement of the forward end of the structure.

In testimony whereof I affix my signature.

ROSCOE C. ZUCKERMAN.